United States Patent
Hurlbert et al.

(10) Patent No.: US 7,213,814 B2
(45) Date of Patent: May 8, 2007

(54) SEAL ASSEMBLY

(75) Inventors: David J Hurlbert, Ypsilanti, MI (US); Hao Shirley Niu, Southfield, MI (US); William T Gordon, Hartland Township, MI (US); Robert M Waters, Hartland, MI (US)

(73) Assignee: Federal-Mogul Worldwide, Inc., Southfield, MI (US)

( * ) Notice: Subject to any disclaimer, the term of this patent is extended or adjusted under 35 U.S.C. 154(b) by 25 days.

(21) Appl. No.: 10/901,497

(22) Filed: Jul. 28, 2004

(65) Prior Publication Data

US 2006/0022415 A1   Feb. 2, 2006

(51) Int. Cl.
*F16J 15/02* (2006.01)

(52) U.S. Cl. ...................... 277/630; 277/637

(58) Field of Classification Search ............... 277/628, 277/630, 637–639, 641–644, 648
See application file for complete search history.

(56) References Cited

U.S. PATENT DOCUMENTS

| | | | |
|---|---|---|---|
| 192,884 A * | 7/1877 | Ubil ........................ 202/247 |
| 2,289,164 A | 7/1942 | Arnold | |
| 2,330,425 A | 9/1943 | Hilton | |
| 2,513,178 A | 6/1950 | Jackson | |
| 3,095,619 A * | 7/1963 | Peterson .................... 277/316 |
| 3,231,286 A | 1/1966 | Carrell | |
| 3,606,361 A | 9/1971 | Pohl | |
| 3,694,894 A * | 10/1972 | Jelinek et al. ............... 29/451 |
| 4,155,561 A | 5/1979 | Rudy | |
| 4,165,622 A * | 8/1979 | Brown, Jr. ................. 338/233 |
| 4,192,520 A * | 3/1980 | Hasegawa ................... 277/591 |
| 4,284,479 A * | 8/1981 | Schulte ...................... 202/248 |
| 4,819,953 A | 4/1989 | Joh | |
| 4,854,839 A | 8/1989 | DiFlora | |
| 4,949,982 A | 8/1990 | DiFlora | |
| 5,080,058 A | 1/1992 | Ferrazzi | |
| 5,390,939 A * | 2/1995 | Terauchi et al. ............. 277/650 |
| 5,511,518 A * | 4/1996 | Jain et al. ................ 123/90.37 |
| 5,676,373 A * | 10/1997 | Sakai et al. ................ 277/648 |
| 5,687,975 A | 11/1997 | Inciong | |
| 5,692,758 A * | 12/1997 | Wikstrom .................... 277/591 |
| 6,048,041 A * | 4/2000 | Mueller et al. ........... 303/119.2 |
| 6,173,969 B1 | 1/2001 | Stoll | |
| 6,304,724 B1 * | 10/2001 | Ando .......................... 396/29 |
| 6,343,796 B1 | 2/2002 | Lee | |
| 6,361,049 B1 | 3/2002 | Joco | |
| 6,390,479 B1 | 5/2002 | Combet | |

* cited by examiner

*Primary Examiner*—Vishal Patel
(74) *Attorney, Agent, or Firm*—Robert L. Stearns; Dickinson Wright PLLC

(57) ABSTRACT

The subject invention discloses a sealing assembly that includes a first component and a second component moveable into and out of mating engagement to form a seal therebetween. The first component has a first sealing surface defining a groove and a sealing bead extends upwardly a predetermined height therefrom. The sealing bead is molded within the groove. The second component has a second sealing surface defining a recess for contacting the sealing bead. When the first and the second components are brought into mating engagement, the sealing bead compresses at most 40% of the predetermined height when the second sealing surface contacts the sealing bead.

16 Claims, 2 Drawing Sheets

SEAL ASSEMBLY

BACKGROUND OF THE INVENTION

1. Technical Field

The subject invention relates generally to static sealing assemblies, and more particularly to those having an elastomeric sealing bead extending upwardly from a first component to create a seal with a second component.

2. Related Art

Various static sealing assemblies are known for creating a fluid-tight seal between mating components. One common type of static seal is a gasket which typically includes a carrier formed of a metal, such as steel, or plastics material on which elongated beads of elastomeric sealing material are adhered. The carrier provides the rigid framework or backbone for properly locating and supporting the sealing beads which, when the components are clamped together, are compressed under pressure to form the fluid-tight seal. Another type of static seal omits the carrier such that the sealing bead is applied directly to the sealing face of one of the two components, but otherwise operates in the same manner to form a seal under compression.

One concern with static seals of either type is that the elastomeric sealing bead not be overcompressed to the point where it ruptures or moves out of position to impair the desired sealing characteristics of the seal. One approach to controlling over deformation of the sealing bead is to mount the sealing bead in a groove of the carrier or sealing face. The groove is shaped and dimensioned relative to the sealing bead to provide a void or air space adjacent to the sealing bead. When deformed under compression, the sealing bead is displaced laterally to fill or partially fill the voids with only a small portion of the sealing bead extending above the groove to provide a fluid-tight seal between the components. Such grooves must have sufficient depth to accommodate the bulk of the sealing bead when in the compressed state. This is particularly problematic with gasket applications since it calls for a fairly thick carrier to accommodate the deep groove for the sealing beads. Not all applications can accommodate such a thick carrier, particularly certain automotive applications where there is a constant trend toward making engines and related components more compact, allowing for less and less space between mating components to achieve a seal. One additional draw back to the deep groove approach for protecting sealing beads on carriers against over-compression is that the deep groove in combination with a thinner carrier reduces the physical strength of the carrier and may impair the sealing characteristics of the seal.

Another approach to controlling over-compression is to build voids or empty spaces into the cross section of the sealing beads, for example providing a void or open channel on either side of a central sealing projection of the bead that runs the length of the bead. Under compression, the central projection is deformed into the voids. One disadvantage to this approach is that the seal material is displaced in opposite directions, putting undue stress on the gasket material which could lead to undesirable fatigue or possibly rupture over time.

SUMMARY OF THE INVENTION AND ADVANTAGES

The subject invention provides a sealing assembly for creating a seal between a first component and a second component. The first component has a first sealing surface with a sealing bead extending upwardly therefrom and the sealing bead has a predetermined original uncompressed height measured from the first sealing surface. The second component presents a second sealing surface to create the seal when the first and the second components are brought into mating engagement. When the first and the second component are in mating engagement, the sealing bead compresses at most 40% of the predetermined original height. The compression of the sealing bead by the second sealing surface creates the seal between the first sealing surface, the sealing bead, and the second sealing surface.

The subject invention provides a sealing assembly that overcomes or greatly minimizes the deficiencies of the known prior seal assemblies discussed above. A seal assembly constructed according to the present invention has greater longevity as a result of the limited compression of the sealing bead (i.e., at most 40%). By designing a seal that operates at 40% or less compression, the present invention overcomes the challenges of prior seals by avoiding cracking or rupturing and loss of elasticity at compressions exceeding 40%. The low compression seals of the present invention further enable those who service a vehicle or clamped components to reuse the seal since its integrity has not been compromised by prolonged over-compression as with the prior seals which must be routinely replaced at time of service.

THE DRAWINGS

These and other advantages of the present invention will be readily appreciated as the same becomes better understood by reference to the following detailed description when considered in connection with the accompanying drawings wherein.

DETAILED DESCRIPTION

Figure 1:
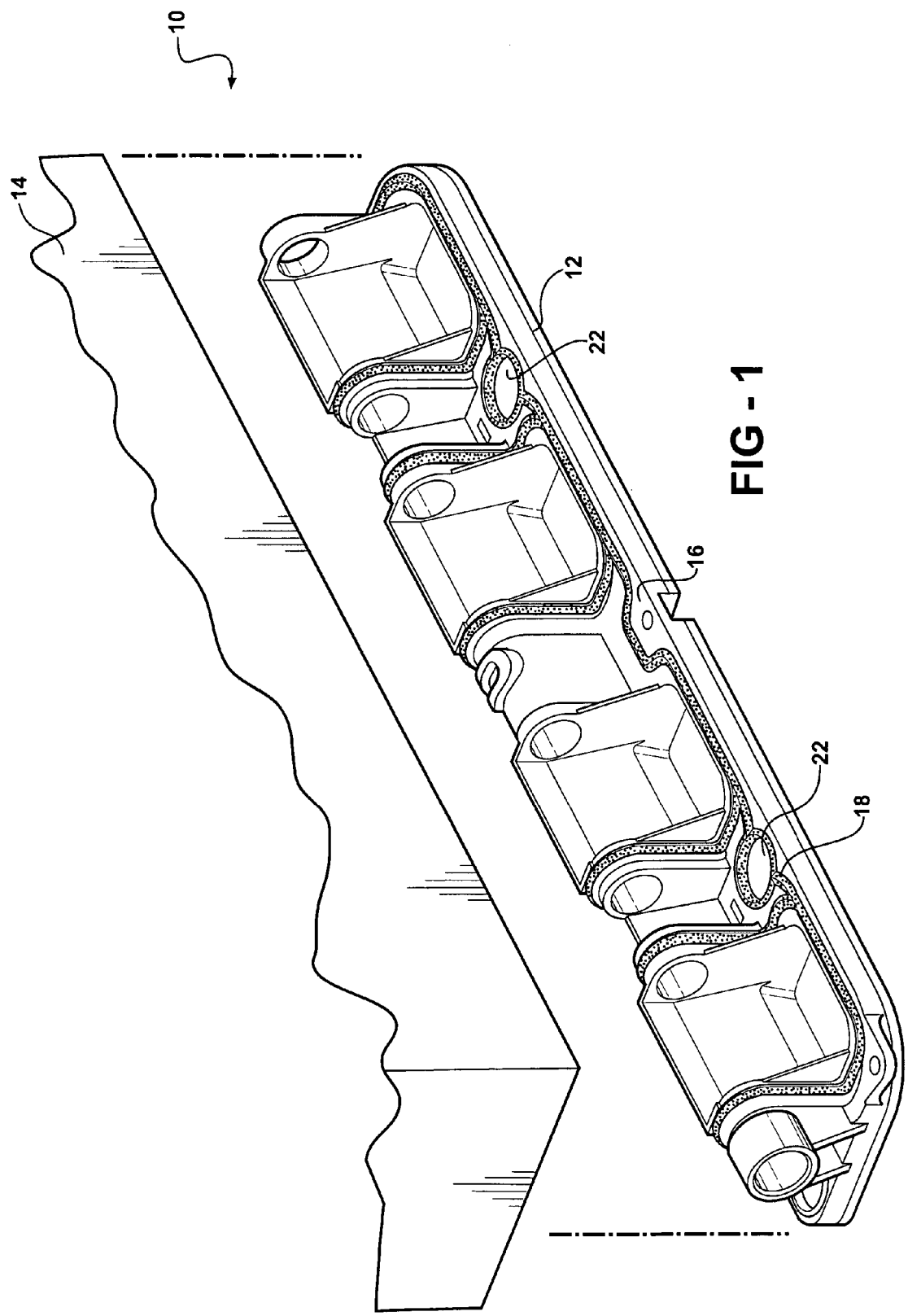
FIG. 1 is a perspective view of a sealing assembly including a first component having a sealing bead and a second component spaced from the first component prior to being brought into engagement.

A sealing assembly constructed according to a first presently preferred embodiment of the invention is shown generally at 10 in FIG. 1. The sealing assembly 10 includes a first component 12 and a second component 14 moveable into and out of mating engagement with the first component 12 to form a seal therebetween. The invention contemplates within its scope that such a seal assembly 10 can be used with any of a number of components, but has particular application to providing a seal between automotive components, such as between a throttle body and a mating component, a water pump housing and a block, a valve cover and a head, an oil pan and the block and similar static sealing applications, and may have application in other sealing environments such as between a head and the block provided the chosen materials can sustain the operating environment.

Figure 2:
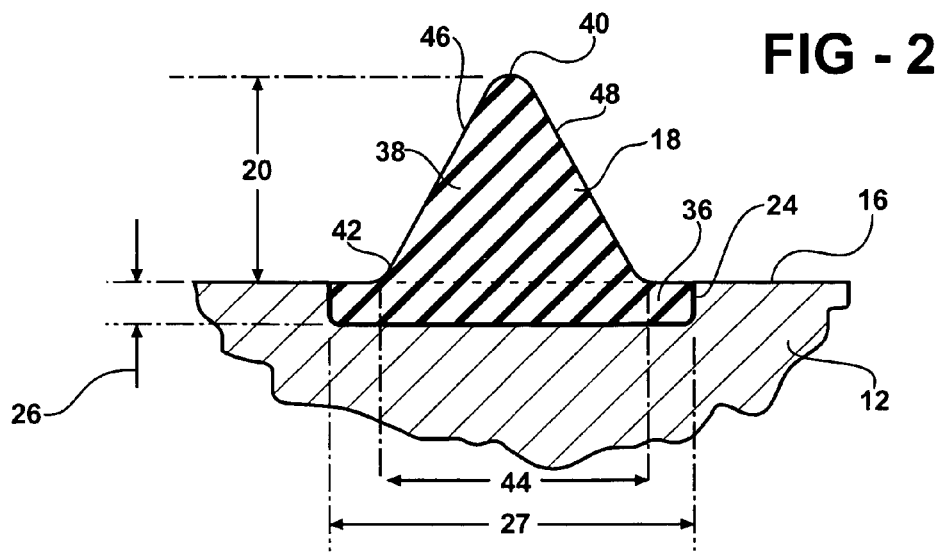
FIG. 2 is a cross-sectional view of a portion of the first component and the sealing bead.
Figure 3:
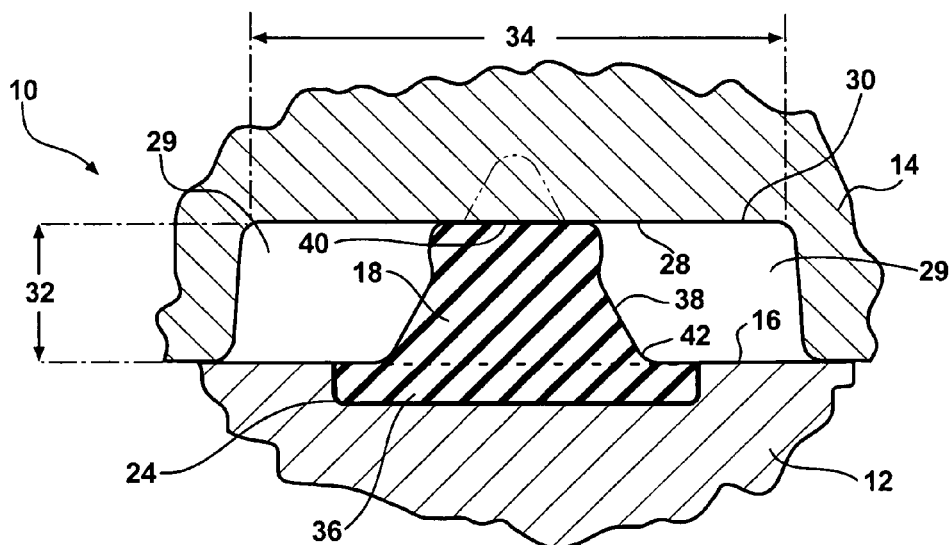
FIG. 3 is a cross-sectional view of the first and the second component in mating engagement and compressing the sealing bead.

FIG. 1 illustrates a throttle body (first component) 12 that is to be bolted in fluid-tight relationship with the accompanying second component 14. The throttle body 12 may be made of aluminum or another material and the component 14 may be made of metal or plastics. The first component 12 could alternatively comprise a carrier (metal or plastics such as Nylon 6—6) of a gasket. FIGS. 2 and 3 show enlarged partial sectional views of the seal assembly 10 with the second component 14 represent either the throttle body or carrier 12. The invention is not limited to the particular material used for the components 12, 14 and thus the invention contemplates the usage of any suitable material within its scope.

Referring to FIGS. 1–3, the first component 12 has a first sealing surface 16 to create the seal with a sealing bead 18. The sealing bead 18 extends upwardly a predetermined height 20 from the first sealing surface 16. The sealing bead 18 is intended to seal between the two components 12, 14 or around a passage 22 which passes between the two components 12, 14. The sealing bead 18 is preferably formed of an elastically compressible material and more preferably is formed from an elastomeric material. One type of preferred elastomeric material is rubber, and more preferably a silicone rubber. One exemplary example of the silicone rubber is commercially available as Duro Silicone Rubber.

In the preferred embodiment, a groove 24 is formed in the first sealing surface 16 having a fixed groove depth 26 and a groove width 27. It is to be understood by those skilled in the art that the subject invention contemplates molding the sealing bead 18 directly to the first component 12 without including the groove 24. However, the presence of the groove 24 is preferred. The groove depth 26 must be large enough to receive the sealing bead 18 and still have adequate physical properties. The groove depth 26 is preferably selected to be no more than one-half of the predetermined height 20 of the sealing bead 18. In the preferred embodiment, the sealing bead 18 is molded into the groove 24 and a base portion 36 of the sealing bead 18 completely fills the groove 24 in the relaxed, uncompressed state of the sealing bead 18.

With reference to FIG. 3, the second component 14 has been brought into mating engagement with the first component 12. The second component 14 also has a second sealing surface 28 which cooperates with the sealing bead 18 and the first sealing surface 16 to create the seal. The second component 14 is formed with a recess 30 that extends into the second sealing surface 28 and receives the sealing bead 18 when the components are brought together. The base of the recess 30 contacts the sealing bead 18 when the first and the second components 12, 14 are brought into mating engagement. The recess 30 has a recess depth 32 that is less than the predetermined height 20 of the sealing bead 18 that projects beyond the first sealing surface 16. Further, the recess 30 has a recess width 34 that is greater than the width of the sealing bead 18. As such, when the first and the second components 12, 14 are in mating, filly sealed engagement with the seating bead 18 in its fully compressed state, the first sealing surface 16, the sealing bead 18, and the second sealing surface 28 define gaps or remaining air spaces 29 of the recess 30 therebetween that are unoccupied by the compressed sealing bead 18. As shown in FIG. 3, the air spaces 29 are enclosed and extend laterally outwardly from the grooves 24 and above the first sealing surface 16.

The relative dimensions and volumes of the components, the recess 30 and the sealing bead 18 allow at most a 40% reduction in the height of the sealing bead 18 at full compression (FIG. 3). In other words, the sealing bead is restricted by design to compresses at most 40% of the predetermined height 20 when the second sealing surface 28 contacts the sealing bead 18. Preferably, the sealing bead 18 compresses at most 38% and more preferably at most 35%. The limited compression of the sealing bead 18 is a result of the second component 14 having the recess depth 32 less than the predetermined height 20 of the sealing bead 18 and a volume greater than the volume of the compressed region of the sealing bead 18 received in the recess 30. As such, the recess depth 32 in the second component 14 controls the compression of the sealing bead 18, and the sealing bead 18. The sealing bead 18 does not compress into the groove 24 of the first component 12 since the groove 24 is completely filled with the sealing bead material prior to compression. Instead, the sealing bead 18 extends laterally into the gaps 29 when compressed.

Referring back to FIG. 2, the longevity of the sealing bead 18 is improved as a result of the shape of the sealing bead 18. The sealing bead 18 has a base portion 36 and a sealing portion 38. The base portion 36 is preferably coextensive with the groove width 27, such that the widths of both are the same and the base portion 36 is molded within the groove 24. The base portion 36, for most applications, has a generally rectangular cross-section. As such, the groove 24 in the first component 12 is generally rectangular shaped. However, it is to be understood that the base portion 36 and the groove 24 may be shaped otherwise so long as the base portion 36 can be received by the groove 24.

The predetermined height 20 of the sealing bead 18 also contributes to the improved longevity and to the limited compression. The sealing portion 38 may have various shapes but preferably has either one of a generally triangular cross-section or a generally frustoconical cross-section. The predetermined height 20 is preferably defined as a height of the sealing portion 38 as measured from the base portion 36. For example, if the base portion 36 is flush with the first sealing surface 16 of the first component 12, then the predetermined height 20 is defined from the first sealing surface 16 to the tip 40 of the sealing bead. The sealing portion 38 has a base 42 that is preferably flush with the base portion 36 and a top 40 that terminates the sealing bead 18. When the sealing bead 18 is triangular shaped, then the top 40 is the tip of the triangle, as in FIG. 2. Therefore, the predetermined height 20 of the sealing bead 18 may be expressed as the height from the base 42 to the top 40.

In the preferred embodiment, the base 42 has a base width 44 greater than the top 40 and less than the base portion 36. A first side 46 and a second side 48 extend upwardly transverse from the base 42 toward the top 40 and interconnects the base 42 of the sealing bead 18 to the top 40 of the sealing bead 18. This occurs when the sealing portion 38 is either triangularly shaped or frustoconically shaped.

Since the compression of the sealing bead 18 is controlled by the recess 30, the groove 24 in the first component 12 can be smaller. This also allows the first component 12 to be formed of different materials and smaller thicknesses can be successfully employed. In the embodiment when the sealing bead 18 is molded directly to the first component 12 without the groove 24, the first component 12 can have a very small thickness.

Figure 4:
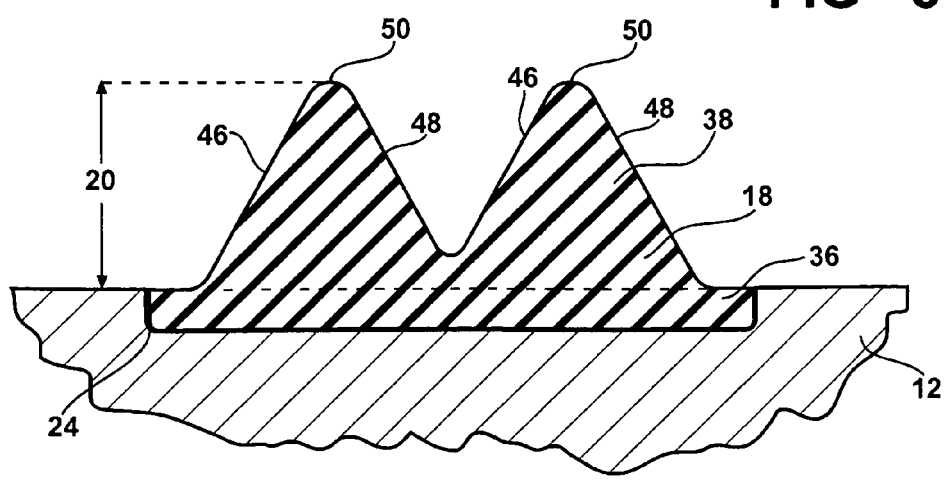
FIG. 4 is a cross-sectional view of an alternate embodiment of the sealing bead.

FIG. 4 illustrates an alternate embodiment of the sealing bead configuration 18. Everything else remains the same as with the first embodiment of FIGS. 1–3. The sealing bead 18 of FIG. 4 is formed with two peaks 50 that are compressed by the second component 14. The additional peak provides an additional line of sealing and thus may enhance the sealing integrity in some applications calling for even greater sealing capabilities than that offered by the first embodiment. The seal and its operation are otherwise equivalent to that of the first embodiment. The sealing bead

18 of FIG. 4 is illustrated as being triangular shaped, however, other shapes may be employed without deviating from the subject invention.

Obviously, many modifications and variations of the present invention are possible in light of the above teachings. The invention may be practiced otherwise than as specifically described within the scope of the appended claims.

What is claimed is:

1. A sealing assembly comprising:
    a first component having a first sealing surface defining a groove and extending into said first sealing surface;
    a one piece sealing bead received in said groove and extending upwardly a predetermined height from said first sealing surface;
    a second component attached to said first component and having an integral second sealing surface defining an integral recess;
    said sealing bead compressing at most 40% of said predetermined height when said second sealing surface contacts said sealing bead to create a seal between said first sealing surface, said sealing bead, and said second sealing surface;
    wherein said groove in said first component has a depth defined as one-half of said predetermined height or less, said depth being greater than zero;
    wherein said recess has a width greater than said sealing bead and defines enclosed gaps between said first sealing surface, said sealing bead, and said second sealing surface; and
    said first sealing surface engages with said second sealing surface and compresses said sealing bead.

2. An assembly as set forth in claim 1 wherein said recess has a depth defined as less than said predetermined height of said sealing bead.

3. An assembly as set forth in claim 1 wherein said first component is further defined as formed from plastic.

4. An assembly as set forth in claim 1 wherein said sealing bead further comprises a base portion received coextensively within said groove and a sealing portion.

5. An assembly as set forth in claim 4 wherein said base portion is constructed as one piece of material with said seal portion coextensive with said groove.

6. An assembly as set forth in claim 5 wherein said base portion is molded within said groove.

7. An assembly as set forth in claim 4 wherein said sealing portion is further defined as having a generally triangular cross-section.

8. An assembly as set forth in claim 4 wherein said sealing portion is further defined as having a generally frustoconical cross-section.

9. An assembly as set forth in claim 4 wherein said base portion is further defined as having a generally rectangular cross-section.

10. A sealing assembly, comprising:
    a first component having a generally flat first sealing surface with a groove extending into said first sealing surface, said groove having a fixed width adjacent said first sealing surface;
    a second component having a generally flat second sealing surface arranged for engagement with said first sealing surface with a recess extending into said second sealing surface, said recess having a width adjacent said second sealing surface greater than said fixed width of said groove and arranged in opposite facing relation there to; and
    a sealing bead having a base portion received coextensively in said groove and a sealing portion extending upwardly from said base portion to a tip, said tip being compressed against said recess said first and second sealing surfaces engaging one another with enclosed air spaces being defined within said recess on opposite sides of said sealing portion, said air spaces extending laterally outwardly from said groove and above said first sealing surface.

11. The assembly of claim 10 wherein said sealing portion extends above said first sealing surface a predetermined height, said groove extending into said first surface to a depth no greater than one-half of said predetermined height, said depth being greater than zero.

12. The assembly of claim 10 wherein said base portion is molded in said groove as one piece with said sealing portion.

13. The assembly of claim 10 wherein said sealing portion extends upwardly from said base portion to a pair of laterally spaced tips, said tips being compressed against said recess when said first and second sealing surfaces are engaged with one another.

14. The assembly of claim 10 wherein said sealing portion is generally triangular in cross-section.

15. The assembly of claim 14 wherein said base portion is generally rectangular in cross-section.

16. The assembly of claim 11 wherein said sealing portion is compressed by said second sealing surface no more than 40% of said predetermined height.

\* \* \* \* \*

UNITED STATES PATENT AND TRADEMARK OFFICE
CERTIFICATE OF CORRECTION

| | |
|---|---|
| PATENT NO. | : 7,213,814 B2 |
| APPLICATION NO. | : 10/901497 |
| DATED | : May 8, 2007 |
| INVENTOR(S) | : David J. Hurlbert et al. |

Page 1 of 1

It is certified that error appears in the above-identified patent and that said Letters Patent is hereby corrected as shown below:

Column 3, line 53: "filly sealed engagement" should read --fully sealed engagement--.
Column 3, line 54: "with the seating bead" should be --with the seating bed--.

Signed and Sealed this

Twenty-seventh Day of November, 2007

JON W. DUDAS
*Director of the United States Patent and Trademark Office*